(12) United States Patent
Otto (10) Patent No.: US 10,274,114 B2
(45) Date of Patent: Apr. 30, 2019

(54) TORQUE RETENTION ARRANGEMENT

(71) Applicant: Barnes Group Inc., Bristol, CT (US)

(72) Inventor: John R. Otto, Bristol, CT (US)

(73) Assignee: Barnes Group Inc., Bristol, CT (US)

( * ) Notice: Subject to any disclaimer, the term of this patent is extended or adjusted under 35 U.S.C. 154(b) by 0 days.

(21) Appl. No.: 15/374,107

(22) Filed: Dec. 9, 2016

(65) Prior Publication Data

US 2017/0146167 A1 May 25, 2017

Related U.S. Application Data

(63) Continuation of application No. 14/613,429, filed on Feb. 4, 2015.

(60) Provisional application No. 61/937,041, filed on Feb. 7, 2014.

(51) Int. Cl.
| | |
|---|---|
| *F16B 31/02* | (2006.01) |
| *F16B 39/24* | (2006.01) |
| *F16B 43/00* | (2006.01) |
| *F16L 23/036* | (2006.01) |
| *F16L 23/24* | (2006.01) |
| *F16B 31/04* | (2006.01) |

(52) U.S. Cl.
CPC .......... *F16L 23/036* (2013.01); *F16B 31/028* (2013.01); *F16B 31/04* (2013.01); *F16B 39/24* (2013.01); *F16B 43/00* (2013.01); *F16B 43/001* (2013.01); *F16L 23/24* (2013.01); *Y10T 29/49948* (2015.01)

(58) Field of Classification Search
CPC ... F01N 13/1805; F16L 21/007; F16L 33/006; F16L 23/036; F16F 1/32; F16B 5/10; F16B 43/00; F16B 31/028; F16B 39/24; F16J 15/26; F02M 55/025

See application file for complete search history.

(56) References Cited

U.S. PATENT DOCUMENTS

| | | | | | |
|---|---|---|---|---|---|
| 3,693,985 | A | * | 9/1972 | Dillner | F16J 15/36 277/381 |
| 4,239,266 | A | * | 12/1980 | Mynhier | F16L 21/007 285/323 |
| 5,688,093 | A | * | 11/1997 | Bowers | F16B 5/10 411/544 |
| 5,829,933 | A | * | 11/1998 | Kramer | F16B 39/24 411/156 |
| 6,361,082 | B1 | * | 3/2002 | Hauki | F16L 33/006 24/279 |
| 6,640,784 | B1 | * | 11/2003 | Sims, Jr. | F02M 55/025 123/456 |
| 2011/0037210 | A1 | * | 2/2011 | Rode | F16F 1/32 267/162 |
| 2011/0133451 | A1 | * | 6/2011 | Singh | F01N 13/1805 285/405 |

\* cited by examiner

*Primary Examiner* — David P Bryant
*Assistant Examiner* — Lee A Holly
(74) *Attorney, Agent, or Firm* — Fay Sharpe LLP (57) ABSTRACT

A torque retention arrangement for a flange bolt connector for use with pipe. The torque retention arrangement a carrier body and a plurality of springs. The carrier body can include a plurality of spring holes equi-spaced around a circumference. A plurality of springs in a vertical stack can be mounted in each of the plurality of spring holes in the carrier. Each spring is in a convex orientation in a pre-torque condition and is in a planar orientation in a post-torque condition.

30 Claims, 9 Drawing Sheets

TORQUE RETENTION ARRANGEMENT

The present invention is a continuation of U.S. patent application Ser. No. 14/613,429 filed Feb. 4, 2015, which in turn claims priority on U.S. Provisional Patent Application Ser. No. 61/937,041 filed Feb. 7, 2014, which is incorporated herein by reference.

The present invention relates to a torque retention arrangement that can be used in association with bolt connections and other types of connection arrangement. On one exemplary embodiment, the torque retention arrangement can be used in a bolt and nut assembly to facilitate in the torqueing of the nut on the bolt. One non-limiting application is the use of the torque retention arrangement in the assembly of flange and pipe connections wherein the torque retention arrangement is used in conjunction with flange bolt torqueing of piping systems, and will be described with particular reference thereto. However, it is to be appreciated that the present exemplary embodiments are also amenable to other like applications.

BACKGROUND OF THE INVENTION

Flange bolt torqueing is an ongoing maintenance issue for companies that utilize a great deal of piping. Piping systems, such as used in chemical processing companies or similar, include a variety of overhead piping and insulated/lined piping which are subject to thermal cycling conditions. Typical flange bolt torqueing for such piping systems includes flat washers on both sides of the pipe flange connection. Tightening the flange bolts usually requires a calibrated torque wrench in order to apply the specified bolt torques (i.e., ft.-lbs. of torque). When anti-seize compounds are used, the torque values can be different. The tightening of the flange bolts with a torque wrench is usually done in a "crisscross" pattern that alternately tightens the bolts located 180° apart. Using this pattern, the bolts are tightened in some percent increment of the desired final bolt torque (i.e., ft.-lbs. of torque) until a majority of the final bolt torque has been achieved. For tightening to the final torque values, the bolts are then sequentially tightened in a clockwise fashion once around the flange. This is done to ensure that the bolts are evenly stressed. Care must be taken to avoid over-torqueing, which can cause damage to any plastic sealing surfaces, liners, plastic flares, and/or plastic faces.

Typically a re-torqueing of the bolts is applied a minimum of twenty four hours after the initial torque or after the first thermal cycle. This re-torqueing allows for seating of the plastic liners and flares and for relaxation of the bolts. Torqueing typically is only done on the system in an ambient, cooled state, and typically never while the process is at elevated temperature.

After the initial torque and re-torque of the bolts, a hydro test can be performed following ANSI requirements. Annual re-torqueing is usually done thereafter, especially if the process lines experience elevated temperatures or extreme ambient temperature situations. Again, annual re-torqueing is typically only done on the system in the ambient or cooled state.

Due to the possibility of mechanical damage to polytetrafluoroethylene (PTFE) flares and/or PTFE-lined piping products, or similar, Belleville springs or disc springs are usually not recommended in the existing flange bolt torqueing systems utilized heretofore. Prior art references do not recommend the use of Belleville springs or disc springs for use with PTFE-lined products.

SUMMARY OF THE INVENTION

The present invention is directed to a torque retention arrangement can be used in association with bolt connections and other types of connection arrangements, and more particularly to a torque retention arrangement that can be used in a flange connector arrangement wherein the torque retention arrangement includes a monolithic body having a carrier. The carrier can optionally include one or more through holes spaced around a circumference. The carrier includes one or more springs vertically positioned or stacked within one or more of the through holes. When a plurality of springs is used, each of the springs can optionally be aligned in a vertical arrangement for receiving a bolt therethrough. One or more springs can be non-coplanar with the carrier in a pre-torque orientation. The one or more springs can be coplanar with the carrier in the loaded and torqued orientation. Aligning the one or more springs coplanar with the carrier can be used to indicate proper torque force.

The torque retention arrangement of the present invention can include a flange bolt connector for a metal, plastic, ceramic, glass, and/or composite material-lined pipe wherein the flange bolt connector includes a monolithic body. The flange bolt connector comprises a carrier body and one or more springs. The carrier body can optionally include one or more apertures or spring holes equi-spaced around a circumference. When a plurality of springs are used, the plurality of springs can be optionally vertically stacked and be mounted in each of the plurality of apertures or spring holes. Each spring can optionally be in a convex orientation in a pre-torque condition and optionally be in a planar orientation in a post torque condition. The height or combined height of the one or more springs in the vertical stack in the torqued condition can be equal to a thickness of the carrier; however, this is not required.

The torque retention arrangement of the present invention can be used to eliminate the possibility of mechanical damage to plastic flares (e.g., PTFE flares, etc.) due to over-torque; however, this is not required. The torque retention arrangement of the present invention can also be used to eliminate the need for an annual re-torque program or re-torqueing after severe temperature cycling; however, this is not required. In addition, the torque retention arrangement of the present invention can be used as an auto compensator for plastic and/or soft material (e.g., soft metals, composite materials, etc.) flare deformation (i.e., cold flow); however, this is not required.

The torque retention arrangement of the present invention can be used to provide an environmentally sound and leak-free system that controls emissions and maintains optimum sealing pressure at pipe connections; however, this is not required.

The torque retention arrangement of the present invention provides for a system that reduces plant maintenance costs; however, this is not required. As will be discussed in more detail hereinafter, the carrier of the torque retention arrangement, including pipe flange bolt springs, can be used to increase flange sealing reliability, provide a visual indication of preload/torque, and/or reduces or eliminates the need for re-torqueing. The reduction in maintenance attributed to the aforementioned can save on the use of spools and fittings which can be a significant savings in flange re-torque costs (i.e., material costs and maintenance labor costs).

In one non-limiting arrangement, there is provided a torque retention arrangement that includes a carrier having a first side and a second side opposite from and spaced from said first side, and wherein the carrier includes a plurality of through spring holes spaced around a circumference; a first set of springs stacked within a first spring hole of the carrier, and wherein each of the springs in the first set of springs is aligned in a vertical arrangement for receiving a bolt therethrough, and at least one spring in the first set of springs is non-coplanar with the carrier in a pre-torque orientation and all of the springs in said first set of springs are coplanar with the carrier in a loaded and torqued orientation; a second set of springs stacked within a second spring hole of the carrier, wherein each of the springs in the second set of springs is aligned in a vertical arrangement for receiving a bolt therethrough, at least one spring in the second set of springs is non-coplanar with the carrier in a pre-torque orientation and all of the springs in the second set of springs are coplanar with the carrier in a loaded and torqued orientation; and, wherein aligning the springs coplanar with the carrier visually indicates a proper torque force. The springs are optionally disc springs. All of the springs in the first and second set of springs are optionally non-coplanar with the carrier in the pre-torque orientation. At least one of the springs in the first and second set of springs optionally includes a coating. The carrier optionally includes an O-ring around a perimeter of at least one of the spring holes of the carrier. The carrier optionally includes a flap plate at least partially inserted in the carrier to limit movement of at least one of the springs in the first set of springs as the spring moves from the pre-torque orientation to the torqued orientation. The carrier optionally includes a plurality of fingers, wherein a first finger includes one of the spring holes that includes the first set of springs, and a second finger includes one of the spring holes that includes the second set of springs. The carrier optionally includes a first grommet, wherein a first grommet is positioned in and connected to one of the spring holes, and wherein the first grommet includes the first set of springs, and wherein the first set of springs is positioned in an interior cavity of the first grommet. The carrier optionally includes a flexible seal positioned in one the spring holes, said seal engaging a plurality of said springs in said first set of springs, said springs in said first set of springs causing said flexible seal to deform as said springs move from said pre-torque orientation to said torqued orientation. The carrier optionally includes a flexible seal lining positioned in one the spring holes, and wherein the seal lining engages a plurality of the springs in the first set of springs, and wherein the spring hole has a non-planar inner surface, and wherein the flexible seal is caused to deform as the springs move from the pre-torque orientation to the torqued orientation. The carrier is optionally flexible and includes a side slot to enable the carrier to be fitted about a pipe. The first and second set of springs each optionally includes at least two springs stacked vertically. One or more springs in each of the first and second set of springs include a total height, and wherein the total height of the one or more springs in the loaded and torqued orientation is optionally equal to a thickness of a portion of the carrier that includes the first and second set of springs. Each of the first and second set of springs optionally includes a coating around an exterior perimeter of the first and second set of springs. The carrier is a continuous circumferential shape. Alternatively, the carrier is a discontinuous circumferential shape. There is also optionally provided a method for connecting pipes sections together which includes a) providing a first pipe section having a first flange; b) providing a second pipe section with a second flange; c) providing a torque retention arrangement as discussed above and wherein the springs in the torque retention arrangement in a pre-torque orientation; d) inserting the torque retention arrangement about the pipe and adjacent to the first flange; e) inserting a body of a first bolt through the first and second flanges such that the body of the bolt passes through the first set of springs in the torque retention arrangement, a first bolt opening in the first flange, and a first bolt opening in the second flange; f) inserting a body of a second bolt through the first and second flanges such that the body of the bolt passes through the second set of springs in the torque retention arrangement, a second bolt opening in the first flange, and a second bolt opening in the second flange; and, g) fastening and tightening a nut to an end of the first and second bolts to cause the first and second flanges to be drawn together and to cause the springs in the first and second spring sets to become coplanar with the carrier, and wherein the aligning of the springs in the first and second spring sets to be coplanar with the carrier visually indicating a proper torque force on the nuts.

In another non-limiting arrangement, there is provided a torque retention arrangement for a plastic-lined pipe that includes a one-piece carrier. The carrier includes a plurality of spring holes equi-spaced around a circumference and a plurality of springs. The plurality of springs is optionally made of metal. At least one of the springs is mounted in each of the plurality of spring holes. Each spring optionally has a convex orientation in a pre-torque condition, and each spring has a planar orientation in a post-torque orientation. The plastic lined pipe can be, but is not limited to, a PTFE material. The springs are optionally disc springs. Each spring hole optionally includes at least two springs stacked vertically. At least one of the springs in each vertical stack optionally includes a coating. At least two springs include a height and the height of the at least two springs in a loaded and torqued orientation is optionally equal to or slightly greater than a thickness of the carrier. The carrier optionally includes an O-ring around a perimeter of each spring hole. The vertical stack of springs optionally includes a coating around an exterior perimeter of the stack of springs. The carrier optionally includes a flap plate positioned at a lower edge of each spring hole. The carrier optionally includes a seal (e.g., rubber seal, plastic seal, polymer seal, etc.) around an interior wall of each spring hole. The carrier has a continuous circumferential shape. Alternatively, the carrier has a discontinuous circumferential shape. The torqued orientation optionally compresses the springs from a non-coplanar orientation with the carrier to a planar orientation with the carrier. The torqued orientation optionally aligns the springs into a planar orientation with the carrier and provides a visual indicator of a desired bolt torque value.

One non-limiting objective of the present invention is the provision of a torque retention arrangement that can be used to increase flange sealing reliability, provide a visual indication of preload/torque, and/or reduce or eliminate the need for re-torqueing.

Another and/or alternative non-limiting objective of the present invention is the provision of a torque retention arrangement that can be used to simplify and/or reduce costs associated with the connection and/or sealing of pipe systems.

Still another and/or alternative non-limiting objective of the present invention is the provision of a torque retention arrangement that can be used in association with bolt connections and other types of connection arrangements.

Yet another and/or alternative non-limiting objective of the present invention is the provision of a torque retention arrangement that includes a monolithic body having a carrier, wherein the monolithic body includes one or more springs vertically positioned or stacked.

Another and/or alternative non-limiting objective of the present invention is the provision of a torque retention arrangement that includes a flange bolt connector for a metal, plastic, ceramic, glass, and/or composite material-lined pipe wherein the flange bolt connector includes a monolithic body, and wherein the flange bolt connector comprises a carrier body and one or more springs.

Still another and/or alternative non-limiting objective of the present invention is the provision of a torque retention arrangement that can be used as a maintenance-free visual torque indicator to reduce or eliminate over-torqueing of a connection system.

Yet another and/or alternative non-limiting objective of the present invention is the provision of a torque retention arrangement that can be used to eliminate the need for an annual re-torque program and/or re-torqueing after severe temperature cycling.

Another and/or alternative non-limiting objective of the present invention is the provision of a torque retention arrangement that can be used as an auto compensator for flare deformation.

Still another and/or alternative non-limiting objective of the present invention is the provision of a torque retention arrangement that can be used to provide an environmentally sound and leak-free system that controls emissions and maintains optimum sealing pressure at the flare face.

These and other objectives and advantages will become apparent from the discussion of the distinction between the invention and the prior art and when considering the preferred embodiment as shown in the accompanying drawings.

BRIEF DESCRIPTION OF THE DRAWINGS

Reference may now be made to the drawings, which illustrate various embodiments that the invention may take in physical form and in certain parts and arrangements of parts wherein.

DETAILED DESCRIPTION OF NON-LIMITING EMBODIMENTS OF THE INVENTION

Referring now to the drawings wherein the showing is for the purpose of illustrating non-limiting embodiments of the invention only and not for the purpose of limiting the same, there is illustrated in FIGS. 1-19 non-limiting examples of a torque retention arrangement in accordance with the present invention. The invention is directed to a device that reduces or eliminates the need to re-torque bolt systems. The torque retention arrangement is particularly applicable to maintaining the torque on the flanges of connecting pipe sections and will be described with particular reference thereto.

Several non-limiting goals and advantages of the torque retention arrangement of the present invention are disclosed hereinafter. For all non-limiting arrangements illustrated in FIGS. 1-19, one of the goals of the torque retention arrangement is to retain the desired torque (i.e., ft.-lbs. of torque) of a bolt connecting, securing, or retention system.

Figure 1:
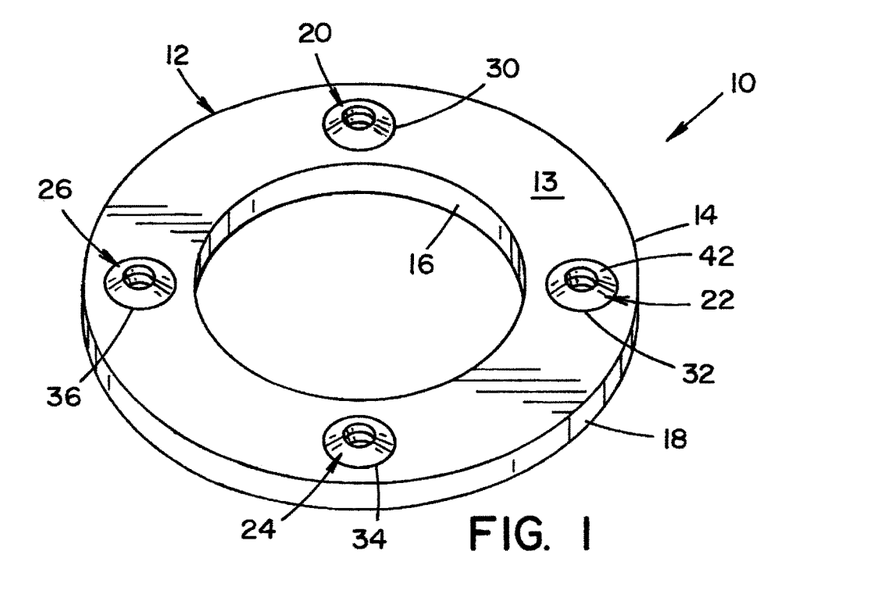
FIG. 1 is a perspective view of one non-limiting embodiment of a torque retention arrangement in accordance with the present invention.
Figure 2:
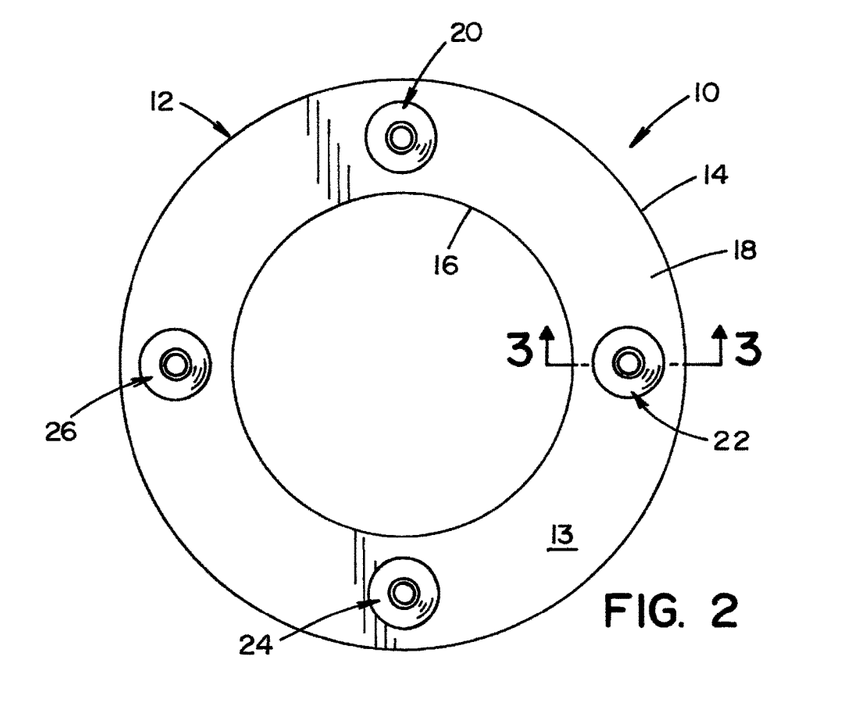
FIG. 2 is top plan view of the torque retention arrangement of FIG. 1.

Referring now to FIGS. 1-4, there is illustrated a non-limiting configuration of the torque retention arrangement of the present invention. The torque retention arrangement 10 has a monolithic configuration and includes the use of a carrier or cartridge 12 inclusive of a spring arrangements 20, 22, 24, 26. The carrier or cartridge 12 is illustrated as having four spring arrangements; however, it will be appreciated that the carrier or cartridge can includes 1, 2 or 3 spring arrangements or more than 4 spring arrangements. The carrier 12 can be formed of any type of material or material combinations (e.g., plastic, metal, ceramic, fabric, composite material, wood, etc.). The carrier 12 can be formed of a material having certain physical properties. The shape, size, configuration and thickness of the carrier 12 are non-limiting. In one non-limiting configuration, the carrier is formed of a plastic material. As illustrated in FIGS. 1 and 2, the carrier 12 has a generally circular outer perimeter 14, a generally circular central opening 16 and a generally circular flange 18. The thickness of the carrier is generally uniform; however, this is not required. The flange 18 is illustrated as including four openings, bores, apertures, or spring holes 30, 32, 34, 36, each including a single spring arrangement 20, 22, 24, 26. As can be appreciated, the carrier can include more than four openings, bores, apertures, or spring holes or less than four openings, bores, apertures, or spring holes. The central opening is generally sized to fit about an outer diameter of a pipe. The openings, bores, apertures, or spring holes in the carrier are typically oriented in the carrier to correspond to opening in the pipe flanges. The size and shape of the openings, bores, apertures, or spring holes on the carrier are generally the same; however, it can be appreciated that one or more of the openings, bores, apertures, or spring holes can have a different size and/or shape from one or more other openings, bores, apertures, or spring holes. As illustrated in FIG. 2, the openings, bores, apertures, or spring holes are equi-spaced around a circumference of the carrier from adjacently positioned openings, bores, apertures, or spring holes; however, this is not required. The openings, bores, apertures, or spring holes are also illustrated in FIG. 2 to be spaced an equal distance from the outer perimeter of the carrier; however, this is not required. As illustrated in FIG. 2, the openings, bores, apertures, or spring holes are spaced from the outer perimeter of the carrier and also spaced from the edge of central opening 16 of the carrier; however, this is not required. Likewise, the spring arrangements that are positioned in openings, bores, apertures, or spring holes are spaced from the outer perimeter of the carrier and also spaced from the edge of central opening 16 of the carrier; however, this is not required. In one non-limiting arrangement, the spring arrangements that are positioned in openings, bores, apertures, or spring holes such that the spring arrangement are spaced an equal distance from the outer perimeter of the carrier and the edge of central opening 16 of the carrier.

The spring arrangement 22 is partially illustrated (FIGS. 3-4) as including multiple stacks of three springs (e.g., Belleville springs or disc springs, etc.) 42, 43, 44. As can be appreciated, the spring arrangement 22 can include less than three springs (one or two springs) or more than three springs in each stack. As can also be appreciated, one or more of the stacks can optionally include one or more washers (e.g., flat washer, lock washer, etc.). As can be appreciated, each of the spring arrangements 20, 22, 24, 26 can have the same number of springs; however, it can be appreciated that one or more of the spring arrangement can have a different number of springs. The size, shape, thickness, material, spring strength and/or spring rating of each of the springs in a spring arrangement that has multiple springs can be the same or different. Also, it can be appreciated that one or more of the spring arrangement can have one or more springs having a different size, shape, thickness, material, spring strength and/or spring rating that one or more other spring arrangements. In one non-limiting arrangement, the same number of springs and the same size, shape, thickness, material, and spring rating of the springs in each of the spring arrangements used in the carrier are the same.

One or more springs in one or more of the spring arrangements includes one or more coatings (e.g., polymer coating, lubricant coating, anti-corrosion coating, anti-stick coating, Teflon® coating, plastic coating, painted coating, etc.); however, this is not required. The one or more coatings, when used, can inhibit or prevent a) corrosion of the springs, b) sticking together of adjacent springs, c) impaired movement of adjacently positioned springs, d) excessive or undesired wear of the springs, and/or e) damage to the springs.

Figure 3:
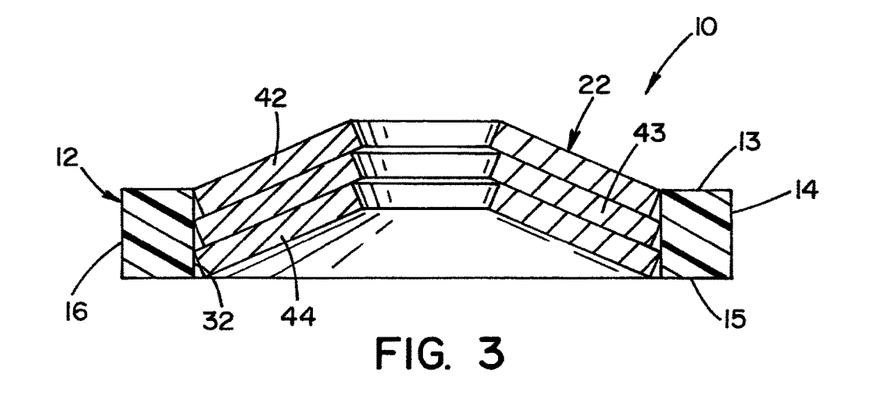
FIG. 3 is cross-sectional view of the torque retention arrangement along line 3-3 of FIG. 2.

As shown in FIG. 3, spring arrangement 22 includes three springs 42, 43, 44 (e.g., disc springs, etc.) that are in a mounted and pre-load position. The springs 42, 43, 44 are retained within bore 32 of carrier 12. Alternatively, the carrier 12 can be molded around the spring arrangement such that the individual stacks of springs are securely retained within their respective bores. In this manner, a user can manipulate the carrier without disturbing the spring arrangement. The mounting arrangement is generally such that the springs are secured to the carrier and cannot be removed from the carrier unless a force is exerted on the spring to force removal of the spring from the carrier or the carrier is damage (e.g., cut, gouged, etc.) so that the springs can be released from the carrier. As shown in FIG. 3, one exterior surface of the springs 22 is in a convex orientation while an opposing exterior face is in a concave orientation. In this pre-load orientation, the stack of springs 42, 43, 44 are non-coplanar with the carrier 12. Generally, at least one of the springs includes a portion that extends above the top plane of surface 13 carrier 12. As illustrated in FIG. 3, a portion of springs 42 and 43 extend above the top plane of surface 13 of the carrier 12. As can be appreciated, one, a plurality, or all of the springs can include a portion that extends above the top plane of surface 13 of the carrier 12. Each of the springs is illustrated as including a central opening to enable a rod or bolt to pass through the opening. The central opening of each of the springs generally lies in a plane that is parallel to the top plane of surface 13 of the carrier 12; however, this is not required.

Figure 4:
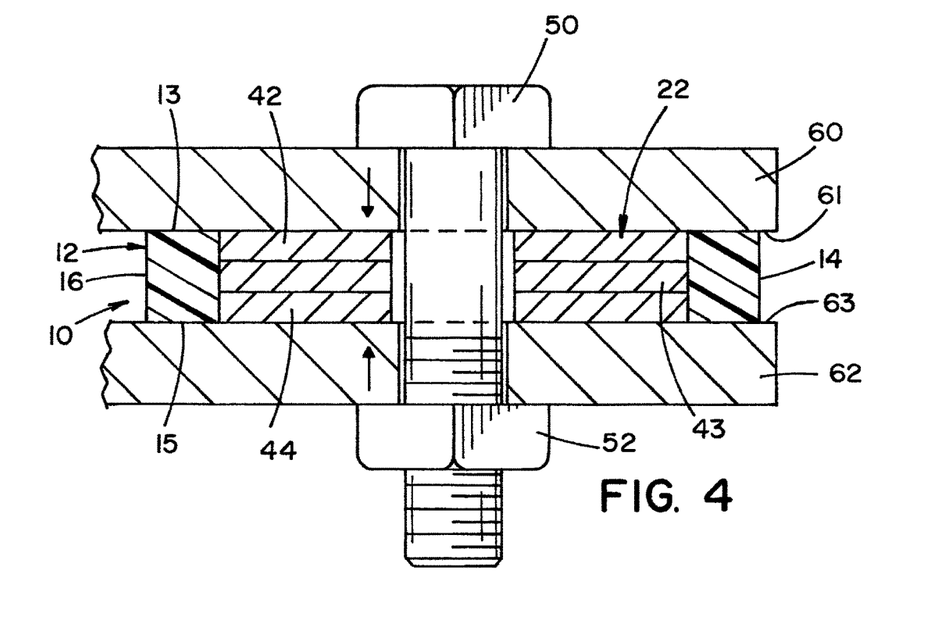
FIG. 4 is a cross-sectional view of the torque retention arrangement of FIG. 3 in a loaded and torqued orientation.

As illustrated in FIG. 4, a portion of a mounting bolt 50 is inserted through the opening of the aligned disc springs 42, 43, 44. A nut 52 is secured to the end of the bolt. The bolt 50 is inserted sequentially through a first flange 60, the spring arrangement 22, and then a second flange 62. Upon tightening, the flanges 60, 62 are moved near each other and the springs 42, 43, 44 are moved from a non-coplanar arrangement relative to the carrier 12 to a planar arrangement to the carrier as illustrated in FIG. 4. As illustrated in FIG. 4, the thickness of the carrier 12 is equal to or slightly less than the combined height or thickness of the springs 42, 43, 44 when in the compressed and loaded (torqued) orientation; however, this is not required. As such, when the inner surfaces 61, 63 of the respective flanges 60, 62 are coplanar with surfaces 13, 15 of the carrier 12, the desired torque ft.-lbs. has been applied to the bolt 50 and nut 52. The material of the carrier about bore 32 is generally deformable to enable the springs 42, 43, 44 to move from a non-coplanar arrangement relative to the carrier 12 to a planar arrangement to the carrier. The diameter of the circular disc springs 42, 43, 44 increases as the disc springs move from a non-coplanar arrangement relative to the carrier 12 to a planar arrangement to the carrier. The ability of the carrier to deform enables the disc springs to increase in diameter without damaging the disc springs, the carrier and/or the bore of the carrier. Generally, the material of the springs and the material forming the carrier and/or the inner surface of the bore are different materials. As illustrated in FIG. 4, the three springs are stacked on top of one another and are in contact with an adjacent spring when the springs move from a non-coplanar arrangement relative to the carrier 12 to a planar arrangement to the carrier; however, this is not required. As illustrated in FIG. 4, the diameter of the carrier is less than the diameter of flanges 60, 62; however, this is not required.

Figure 5:
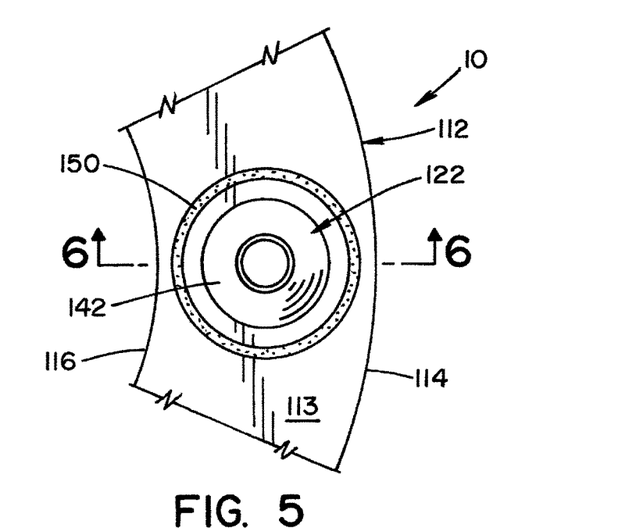
FIG. 5 is a partial top plan view of another non-limiting embodiment of a torque retention arrangement in accordance with the present invention.
Figure 6:
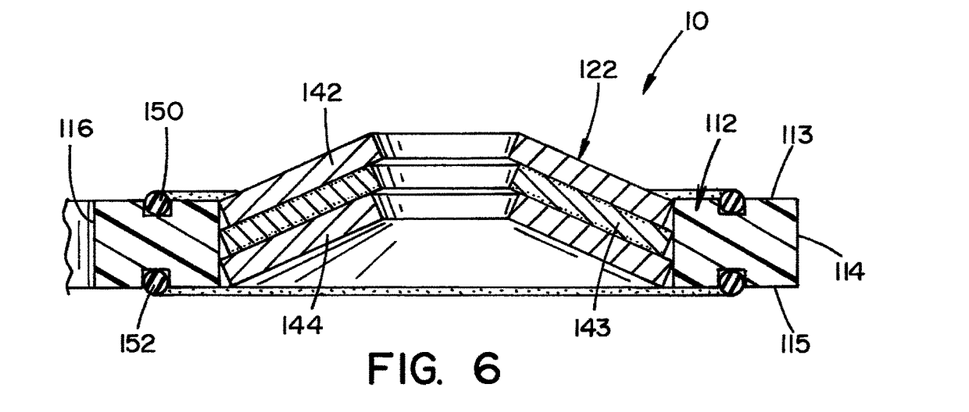
FIG. 6 is a cross-sectional view of the torque retention arrangement of FIG. 5.

Referring now to FIG. 5-6, another non-limiting configuration of the torque retention arrangement 10 is illustrated. The spring arrangement 122 can include a plurality of individual disc springs 142, 143, 144. One or more of the disc springs 145 can be lubricated and/or coated for protection; however, this is not required. Similar to the arrangement described above, carrier 112 can include an outer perimeter 114 and an inner perimeter 116, as well as a first exterior surface 113 and a second exterior surface 115. The materials, structure and operation of the carrier and spring arrangement illustrated in FIGS. 5-6 are the same or generally the same as the carrier and spring arrangement illustrated in FIGS. 1-4, thus will not be repeated herein.

A coating arrangement on the spring 143 (i.e., lubricant coating, anti-corrosion coating, Teflon® coating, plastic coating, painted coating, polymer coating, anti-stick coating, flexible casing, etc.) and/or O-rings or gaskets 150, 152 on the carrier 112 can be used to protect the spring arrangement 122 (i.e., from corrosion, sticking to one another, etc.); however, this is not required. One or more or all of the springs in the spring arrangement can optionally include the coating arrangement. As illustrated in FIG. 6, only the middle spring includes the coating arrangement. As illustrated in FIGS. 5 and 6, O-ring 150 is arranged around the spring arrangement 122 on one surface 113 of the carrier 112. Another O-ring 152 can be applied to the other opposing surface 115 of the carrier 112. These O-rings can be used to provide additional sealing when flanges 60, 62 are moved near each other upon the tightening of the nuts and bolts 50, 52 as illustrated in FIG. 4. The material used to form the O-rings is non-limiting. Generally the O-ring is formed of a compressible material.

Figure 7:
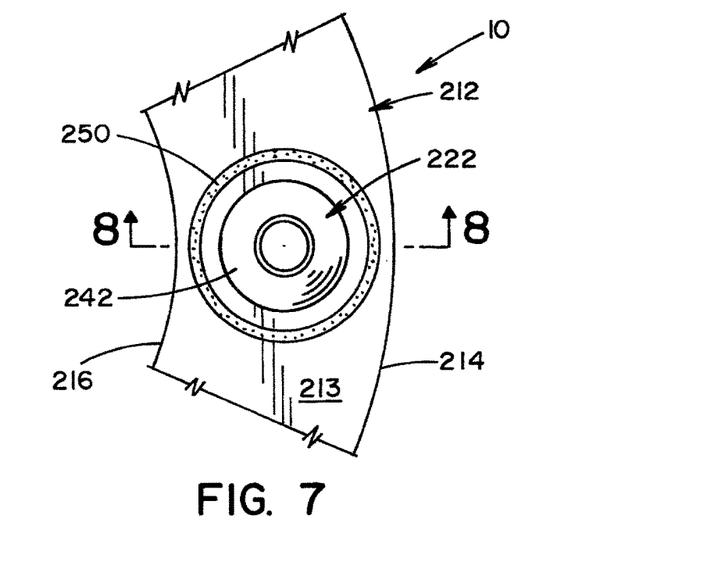
FIG. 7 is a partial top plan view of another non-limiting embodiment of a torque retention arrangement in accordance with the present invention.
Figure 8:
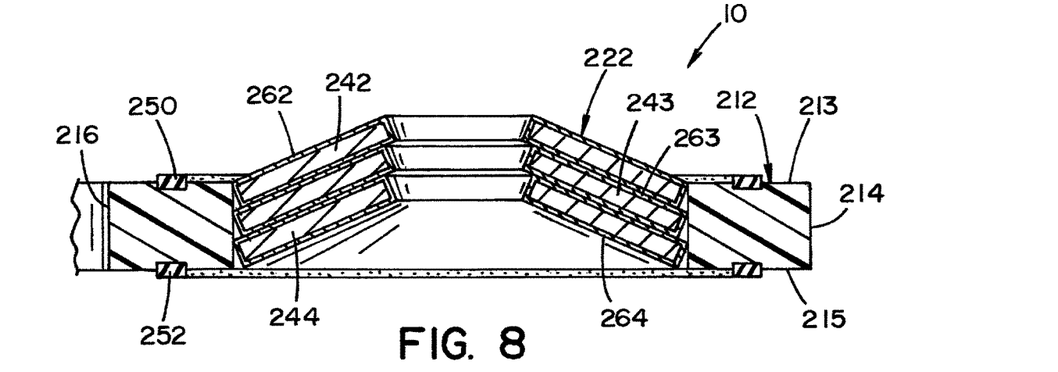
FIG. 8 is a cross-sectional view of the torque retention arrangement along line 8-8 of FIG. 7.

Referring now to FIGS. 7-8, another non-limiting configuration of a torque retention arrangement 10 is illustrated. The spring arrangement 222 can include a plurality of individual disc springs 242, 243, 244. As shown, each spring can be lubricated and/or coated 262, 263, 264 for protection. Similar to the arrangement described above regarding FIGS. 1-6, carrier 212 can include an outer perimeter 214 and an inner perimeter 216, as well as a first exterior surface 213 and a second exterior surface 215. The materials, structure and operation of the carrier and spring arrangement illustrated in FIGS. 7-8 are the same or generally the same as the carrier and spring arrangement illustrated in FIGS. 1-6, thus will not be repeated herein.

The coating arrangement 262, 263, 264 on the springs 242, 243, 244 (i.e., polymer coating, lubricant coating, anti-corrosion coating, anti-stick coating, Teflon® coating, plastic coating, painted coating, flexible casing, etc.) and/or O-rings or gaskets 250, 252 on the carrier 212 can be used to protect the spring arrangement 222; however, this is not required. One or more or all of the springs in the spring arrangement can optionally include the coating arrangement. As illustrated in FIG. 8, all three springs include the coating arrangement. As shown in FIGS. 7 and 8, the O-ring 250 is arranged around the spring arrangement 222 on one surface 213 of the carrier 212. Another O-ring 252 can be applied to the other opposing surface 215 of the carrier 212. These O-rings can be used to provide additional sealing when flanges 60, 62 are moved near each other upon the tightening of the nuts and bolts 50, 52 as illustrated in FIG. 4. The O-rings illustrated in FIGS. 7-8 have a polygonal cross-sectional shape (e.g., square, rectangular, etc.) and the O-rings illustrated in FIGS. 5-6 have a circular or oval cross-sectional shape. The top and bottom surfaces 213, 215 of the carrier includes an O-ring slot such that only a portion of the O-ring is positioned within the O-ring slot. A similar O-ring slot arrangement is illustrated in FIGS. 5-6. The O-ring slot is designed to position and optionally retain the O-ring in the O-ring slot. The shape of the O-ring slot is non-limiting. As illustrated in FIGS. 5-8, a portion of the O-ring extends over the top and bottom surfaces of the carrier such that when flanges 60, 62 are moved near each other upon the tightening of the nuts and bolts 50, 52 as illustrated in FIG. 4, the O-rings are compressed between the carrier and the adjacently positioned flange.

Figure 9:
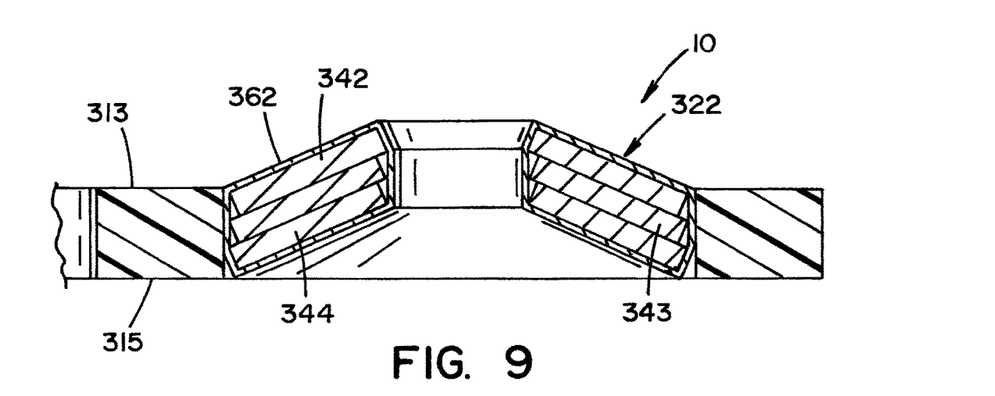
FIG. 9 is a cross-sectional view of another non-limiting embodiment of a torque retention arrangement in accordance with the present invention.

Referring now to FIG. 9, another non-limiting configuration of the torque retention arrangement 10 is illustrated. The spring arrangement 322 can include a plurality of individual disc springs 342, 343, 344. As shown in FIG. 9, the stacked arrangement of springs 322 can include a coating 362 around the entire stacked arrangement 322. This coating 362 can be a wrapping or a dipping of the stacked springs 322. Such a coating can optionally be a similar coating material as described above. Additionally or alternatively, the coating 362 can be a wrapping of plastic or a foil to secure and hold the stacked springs 322 in a packaged arrangement. The materials, structure and operation of the carrier and spring arrangement illustrated in FIG. 9 are the same or generally the same as the carrier and spring arrangement illustrated in FIGS. 1-8, thus will not be repeated herein. FIG. 9 does not illustrate the use of one or more O-rings; however, it will be appreciated that the torque retention arrangement illustrated in FIG. 9 could optionally include one or more O-rings and a modified carrier having one or more O-ring slots as illustrated in FIGS. 5-8. Likewise, the torque retention arrangement illustrated in FIGS. 1-4 can optionally include one or more O-rings and the modified carrier having one or more O-ring slots (as illustrated in FIGS. 5-8), and/or a coating arrangement on one or more of the springs (as illustrated in FIGS. 5-9).

Figure 10:
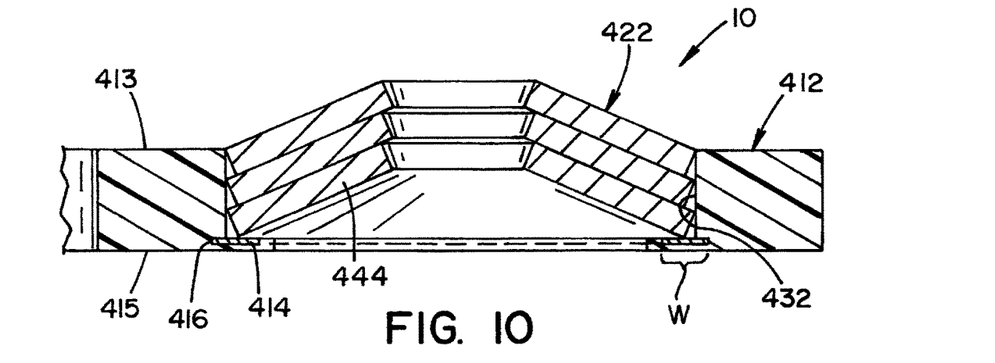
FIG. 10 is a cross-sectional view of another non-limiting embodiment of a torque retention arrangement in accordance with the present invention.

Referring now to FIG. 10, another non-limiting configuration of the torque retention arrangement 10 is illustrated. The carrier 412 is therein shown with a shim or flap plate 414 adjacent the lower end of the bore 432. It is to be appreciated that when a bolt and nut are torqued, the lowest edge of disc spring 444 could dig into the lower part of the bore 432. The shim or flap plate 414 provides a surface for the lower edge of disc spring 444 to slide across. In this arrangement, the lower edge of the bottom disc spring 444 will not scrape against the underlying flange surface during the torqueing operation. The shape, thickness and material used to form the flap plate are non-limiting (e.g., metal, plastic, composite material, ceramic material, etc.). As illustrated in FIG. 10, the flap plate is spaced inwardly from the plane of bottom surface 415 of the carrier 412. As can be appreciated, flap plate 414 can be positioned even with the plane of bottom surface 415 of the carrier 412. Carrier 412 includes a plate slot 416 that is used to secure the flap plate to the carrier. The plate slot is illustrated as spaced inwardly from the plane of bottom surface 415 of the carrier 412. The flap plate is generally sized such that it was a width W that is less than 40% the width or diameter of bore 432, and generally less than 30% the width or diameter of bore 432, and typically less than 20% the width or diameter of bore 432, and more typically less than 15% the width or diameter of bore 432 (e.g., 10% the width or diameter of the bore, etc.). The thickness of the flap plate is generally less than the thickness of one or all of the springs; however, this is not required. As illustrated in FIG. 10, spring 444 contacts the top surface of flap plate 414 prior to the compression of the spring; however, this is not required. The materials, structure and operation of the carrier and spring arrangement illustrated in FIG. 10 are the same or generally the same as the carrier and spring arrangement illustrated in FIGS. 1-9, thus will not be repeated herein. FIG. 10 does not illustrate the use of one or more O-rings; however, it will be appreciated that the torque retention arrangement illustrated in FIG. 10 could optionally include one or more O-rings and a modified carrier having one or more O-ring slots (as illustrated in FIGS. 5-8) and/or a coating arrangement on one or more of the springs (as illustrated in FIGS. 5-9). As can also be appreciated, the flap plate and plate slot arrangements illustrated in FIG. 10 can optionally be used in the torque retention arrangements illustrated in FIGS. 1-9.

Figure 11:
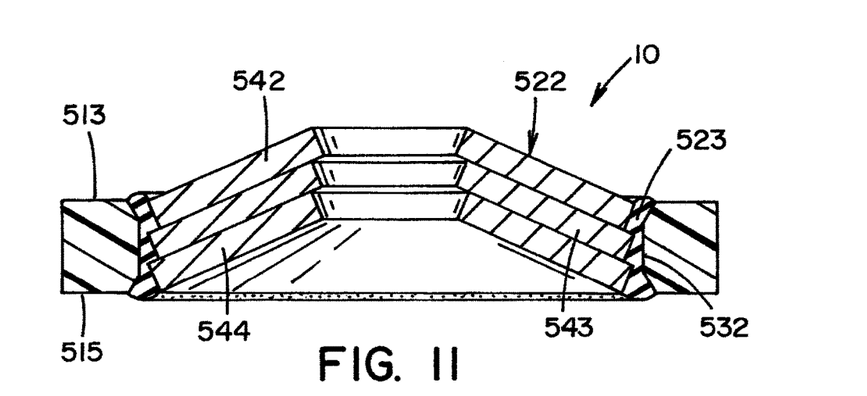
FIG. 11 is a cross-sectional view of another non-limiting embodiment of a torque retention arrangement in accordance with the present invention.
Figure 12:
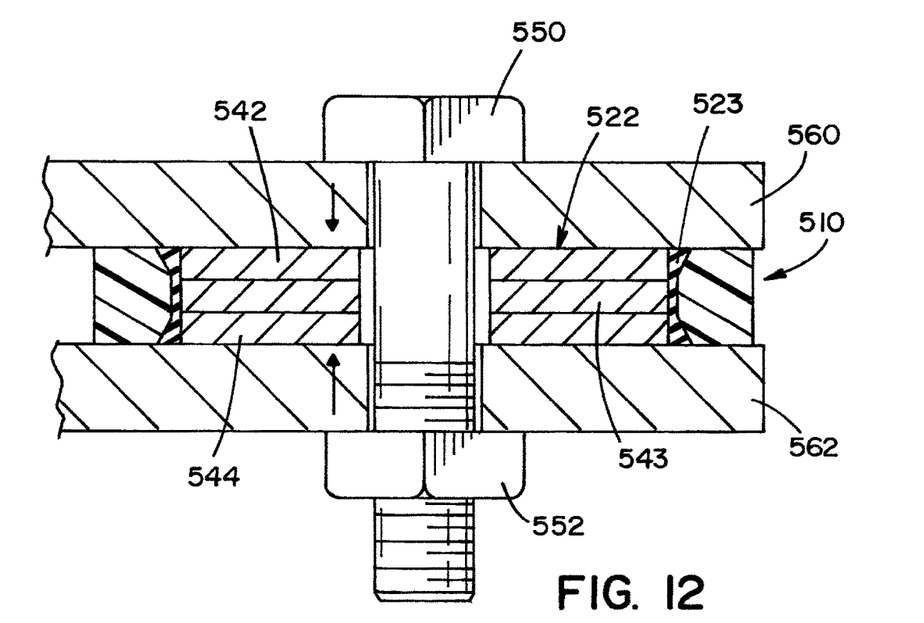
FIG. 12 is a cross-sectional view of the torque retention arrangement according to FIG. 11 in a loaded and torqued orientation.

Referring now to FIGS. 11-12, another non-limiting configuration of the torque retention arrangement 10 is illustrated. The spring arrangement 522 can include a seal 523 around the interior of the associated bore 532. The shape, size and material of the seal are non-limiting. The seal is generally formed of a compressible and deformable material. In one exemplary example, the seal 523 can be a rubber seal, plastic seal, polymer seal, etc. that initially helps to secure the disc springs 542, 543, 544 in place, and upon torqueing a mounting bolt 550 and nut 552 between the respective flanges 560, 562, the disc springs 542, 543, 544 compress against the seal 523 to keep out any foreign materials from getting into the bore 532 and between the disc springs 542, 543, 544. As illustrated in FIGS. 11-12, the shape of the seal changes when the springs are compressed when flanges 560, 562 are moved near each other upon the tightening of the nut and bolt 550, 552 as illustrated in FIG. 12. As illustrated in FIGS. 11-12, the wall of the bore 532 is non-planar and includes one or more angle surfaces and angle away from the center of the bore; however, this is not required. These angles surfaces enable the seal to properly deform and to allow the springs to become planar when flanges 560, 562 are moved near each other upon the tightening of the nut and bolt 550, 552 as illustrated in FIG. 12. Generally, the material used to form the seal is different from the material used to form the carrier. Typically, the material of the carrier is a harder, less deformable material than the material used for the seal; however, this is not required. The seal can be frictionally connected to the carrier or connected by other or additional means (e.g., adhesive, melt bond, etc.). As illustrated in FIG. 11, a portion of the seal optionally extends above and/or below surfaces 513, 515 prior to the compression of the springs, but not after the compression of the springs (as illustrated in FIG. 12). The materials, structure and operation of the carrier and spring arrangement illustrated in FIGS. 11-12 are the same or generally the same as the carrier and spring arrangement illustrated in FIGS. 1-10, thus will not be repeated herein. FIGS. 11-12 do not illustrate the use of one or more O-rings; however, it will be appreciated that the torque retention arrangement illustrated in FIGS. 11-12 could optionally include one or more O-rings and a modified carrier having one or more O-ring slots (as illustrated in FIGS. 5-8) and/or a coating arrangement on one or more of the springs (as illustrated in FIGS. 5-9). As can also be appreciated, the flap plate and plate slot arrangements illustrated in FIG. 10 can optionally be used in the torque retention arrangements illustrated in FIGS. 11-12.

Figure 13:
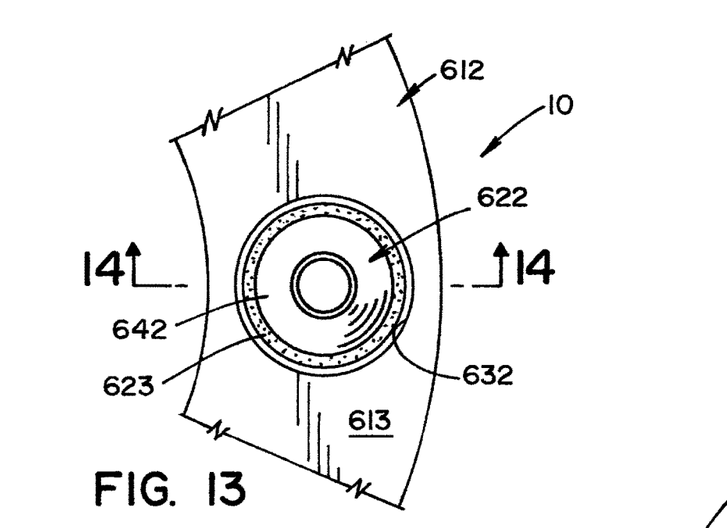
FIG. 13 is a partial top plan view of another non-limiting embodiment of a torque retention arrangement in accordance with the present invention.
Figure 14:
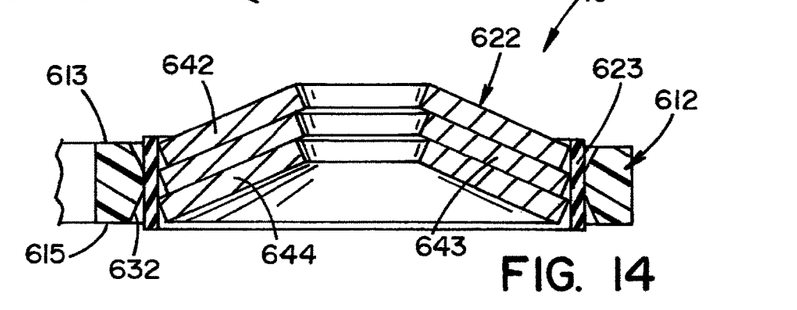
FIG. 14 is a cross-sectional view of the torque retention arrangement along line 14-14 of FIG. 13 in an unloaded orientation.
Figure 15:
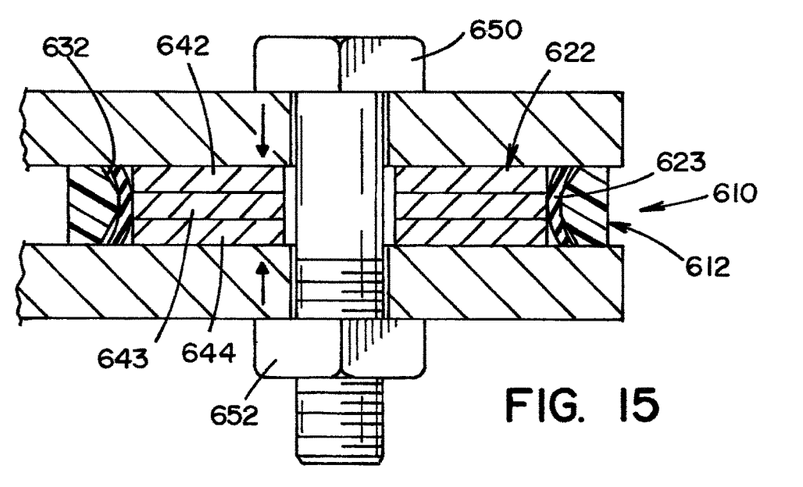
FIG. 15 is a cross-sectional view of the torque retention arrangement according to FIG. 14 in a loaded and torqued orientation.

Referring now to FIGS. 13-15, another non-limiting configuration of the torque retention arrangement 10 is illustrated. The spring arrangement 622 therein illustrated includes a series of three disc springs 642, 643, 644 and a seal lining 623 within the bore 632. As shown, the walls of the bore 632 are not planar. The non-planar walls of the bore 632 provide an area for the seal lining 623 to expand and bend when the torque flange connector 610 is secured with a nut 652 and bolt 650 to the extent of flattening the disc springs 642, 643, 644 into a co-planar arrangement with the carrier 612 as illustrated in FIG. 15. The seal lining 623 can be frictionally connected to the carrier or connected by other or additional means (e.g., adhesive, melt bond, etc.). Generally, the material used to form the seal liner is different from the material used to form the carrier. Typically, the material of the carrier is a harder, less deformable material than the material used for the seal liner; however, this is not required.

As illustrated in FIG. 14, a portion of the seal liner optionally extends above and/or below surfaces 613, 615 prior to the compression of the springs, but not after the compression of the springs (as illustrated in FIG. 15). The materials, structure and operation of the carrier and spring arrangement illustrated in FIGS. 13-15 are the same or generally the same as the carrier and spring arrangement illustrated in FIGS. 1-12, thus will not be repeated herein. FIGS. 13-15 do not illustrate the use of one or more O-rings; however, it will be appreciated that the torque retention arrangement illustrated in FIGS. 13-15 could optionally include one or more O-rings and a modified carrier having one or more O-ring slots (as illustrated in FIGS. 5-8) and/or a coating arrangement on one or more of the springs (as illustrated in FIGS. 5-9). As can also be appreciated, the flap plate and plate slot arrangements illustrated in FIG. 10 can optionally be used in the torque retention arrangements illustrated in FIGS. 13-15. As also can be appreciated, the seal illustrated in FIGS. 11-12 could optionally be used in the torque retention arrangement of FIGS. 13-15. As can also be appreciated, the seal liner illustrated in FIGS. 13-15 could optionally be used in the torque retention arrangement of FIGS. 1-12.

Figure 16:
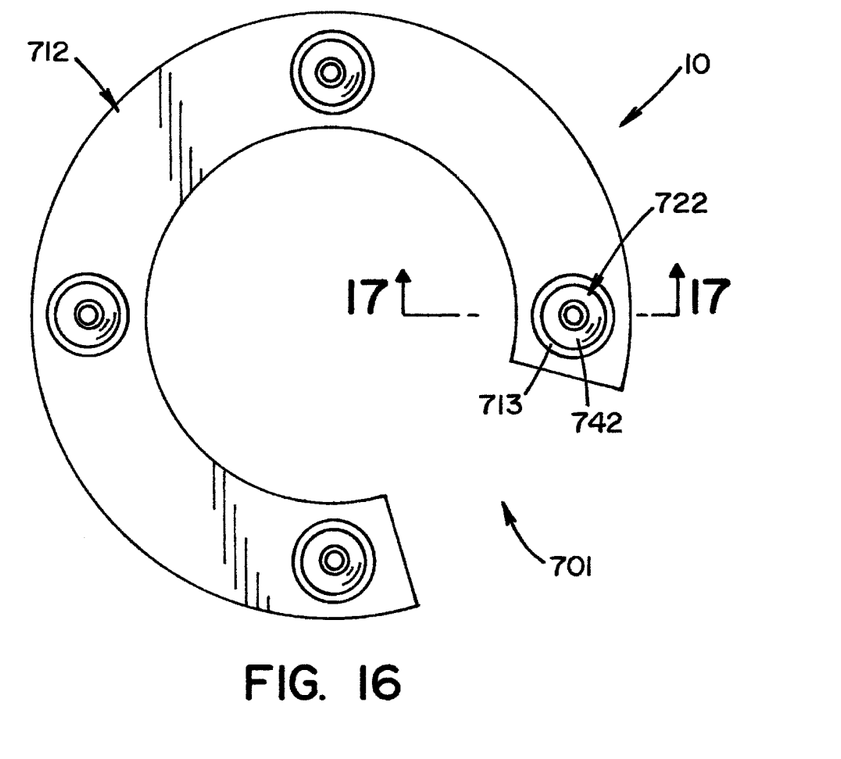
FIG. 16 is a top plan view of another non-limiting embodiment of a torque retention arrangement in accordance with the present invention.
Figure 17:
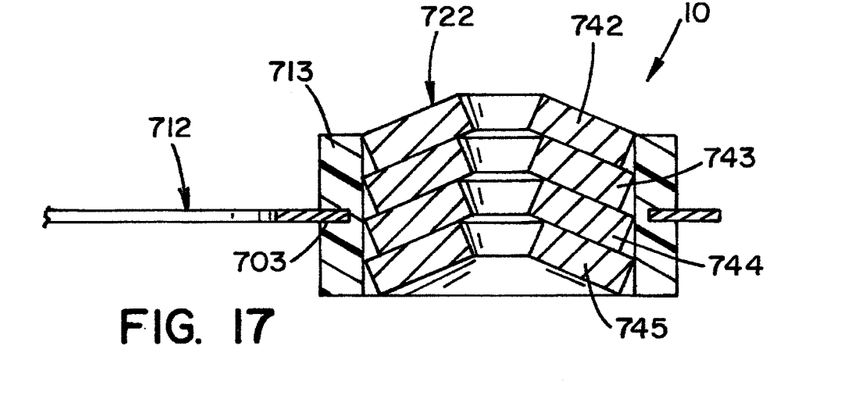
FIG. 17 is a cross-sectional view of the torque retention arrangement along line 17-17 of FIG. 16.
Figure 18:
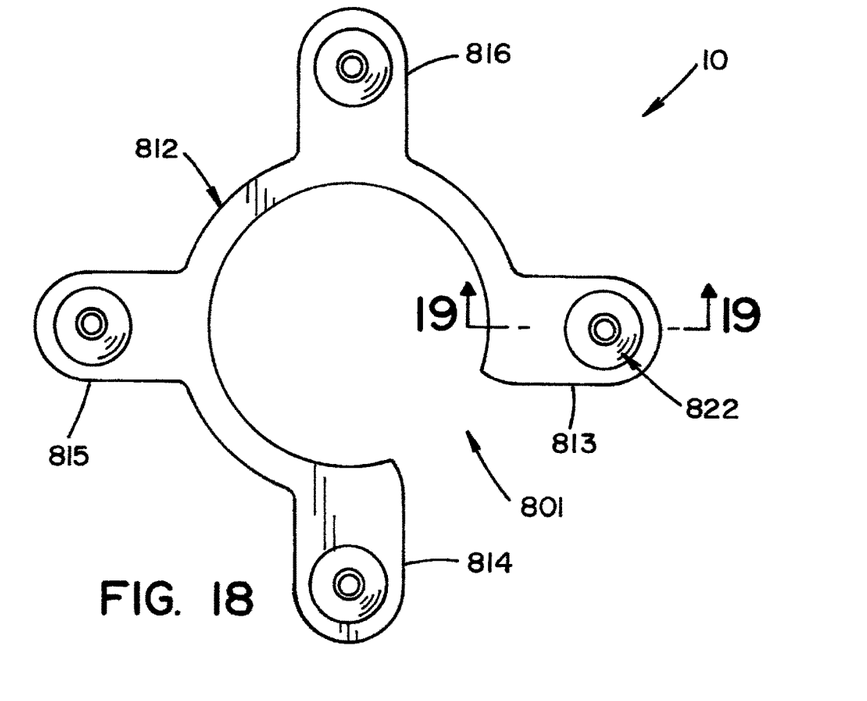
FIG. 18 is a top plan view of another non-limiting embodiment of a torque retention arrangement in accordance with the present invention; and, FIG. 19 is a cross-sectional view of the torque retention arrangement along line 19-19 of FIG. 18.

Referring to FIGS. 16-19, additional non-limiting configurations of the torque retention arrangement 10 are illustrated. As illustrated in FIGS. 16 and 18, the carrier includes a side slot, opening or gap. Such an arrangement can be used to enable the torque retention arrangement to be slipped about the pipe liner positioned between the pipe flanges without having to fully separate the pipes. This can provide a significant advantage in time and can reduce the complexity of having to insert and replace the torque retention arrangements of the present invention on existing pipe systems. A gap 701, 801 in the carrier 712, 812 illustrated in FIGS. 16 and 18 allows the entire monolithic retention arrangement 710, 810 to be installed onto the pipe at any stage in the assembly process in the same fashion as a snap ring, thereby eliminating the need for the monolithic product 710, 810 to be stacked in a particular order. This particular arrangement is particularly beneficial in situations where the torque retention arrangement is used as a retrofit device. The entire flange/fitting assembly, including any plastic seal (e.g., PTFE seal, etc.), can remain intact while the fasteners and the torque retention arrangement are installed.

Referring now to FIGS. 16-17, there is illustrated a single-piece flexible material (i.e., metallic, plastic, composite material) forming carrier 712. Positioned in the carrier is a plurality of grommets 713. The carrier includes a plurality of openings that each includes a grommet. The number of grommets on the carrier is non-limiting. The distance between adjacently positioned grommets about the perimeter of the carrier is generally the same; however, this is not required. Grommets 713 can be used to hold the springs 742, 743, 744, 745 to the carrier 712 and provide sealing and visual cues to the subsequent spring compression. The grommets can be formed of any type of material (e.g., plastic, metal, composite material, etc.). The thickness of the grommets 713 provides the desired visual cues to the achieved post-load and torqued orientation for the torque retention arrangement. Four springs are illustrated in the grommet; however, it can be appreciated that less than four or more than four springs can be included in one or more or all of the grommets.

The carrier 712 can comprise a thin flat piece of material that retains the grommet 713 for retention of the spring arrangement 722. As shown, the spring arrangement 722 includes four springs 742, 743, 744, 745 stacked in a vertical arrangement. It is to be appreciated that any number of plurality of springs can be used in the aforementioned arrangement. Grommet 713 has a generally cylindrical shape; however, this is not require. Each of the grommets is generally the same size and shape; however, this is not required. The grommet is generally formed of a different material from the carrier; however, this is not required. The grommet includes an internal cavity wherein the springs are located. The springs can be connected to the grommet by any means. As illustrated in FIG. 17, the exterior surface of the grommet includes a carrier slot 703 that is designed to receive a portion of the carrier such that the grommet can be secured to the carrier. Generally, the carrier slot is positioned at the mid-point of the longitudinal axis of the grommet as illustrated in FIG. 17; however, this is not required. The thickness of the carrier is generally less than the longitudinal length of the grommet; however, this is not required. In one non-limiting arrangement, the thickness of the carrier is generally less than 70% the longitudinal length of the grommet, typically the thickness of the carrier is less than 50% the longitudinal length of the grommet, more typically the thickness of the carrier is less than 40% the longitudinal length of the grommet, still more typically the thickness of the carrier is less than 25% the longitudinal length of the grommet, a yet more typically the thickness of the carrier is less than 10% the longitudinal length of the grommet. The longitudinal length of the grommet is equal to or slightly less than the combined height or thickness of the stacked springs when in the compressed and loaded (torqued) orientation; however, this is not required. The materials, structure and operation of the spring arrangement illustrated in FIGS. 16-17 are the same or generally the same as the carrier and spring arrangement illustrated in FIGS. 1-15, thus will not be repeated herein. FIGS. 16-17 do not illustrate the use of one or more O-rings about one or more grommets; however, it will be appreciated that the torque retention arrangement illustrated in FIGS. 16-17 could optionally include one or more O-rings and a modified grommet having one or more O-ring slots (as illustrated in FIGS. 5-8) and/or a coating arrangement on one or more of the springs (as illustrated in FIGS. 5-9). As can also be appreciated, the flap plate and plate slot arrangements illustrated in FIG. 10 can optionally be used in the grommets illustrated in FIGS. 16-17. As also can be appreciated, the seal illustrated in FIGS. 11-12 could optionally be used in the grommets illustrated in FIGS. 16-17. As can also be appreciated, the seal liner illustrated in FIGS. 13-15 could optionally be used in the grommets illustrated in FIGS. 16-17.

Figure 19:
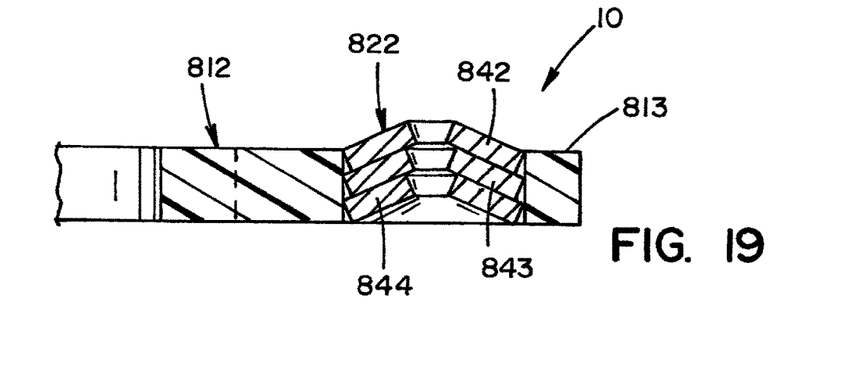

As shown in FIGS. 18 and 19, the torque retention arrangement 10 can include a carrier 812 with a plurality of fingers 813, 814, 815, 816 extending therefrom. The fingers 813, 814, 815, 816 can each include a bore hole therethrough for mounting the spring arrangement 822 therein. The number of fingers in the carrier is non-limiting. Generally, the carrier includes a plurality of fingers. As described above, the plurality of springs 842, 843, 844 can be aligned in a vertical arrangement and be retained within the respective bore holes. As illustrated in FIG. 18, the longitudinal length of the fingers is greater than the width of the portion of the carrier between the fingers; however, this is not required. In one non-limiting arrangement, the smallest width of the portion of the carrier between the fingers is generally less than 70% the longitudinal length of the fingers, typically the smallest width of the portion of the carrier between the fingers is generally less than 50% the longitudinal length of the fingers, and more typically the smallest width of the portion of the carrier between the fingers is generally less than 30% the longitudinal length of the fingers.

As illustrated in FIG. 18, the portion of the carrier between two fingers has a generally constant width and has an arcuate shape; however, this is not required. The spring arrangement 822 is illustrated in FIG. 18 as being located closer, but spaced from, the end of the finger than the bottom of the finger; however, this is not required. The front end of each of the fingers is generally arcuate shaped; however, this is not required. The thickness of the fingers at the location of the stacked springs is equal to or slightly less than the combined height or thickness of the stacked springs when in the compressed and loaded (torqued) orientation; however, this is not required. The materials, structure and operation of the spring arrangement illustrated in FIGS. 18-19 are the same or generally the same as the carrier and spring arrangement illustrated in FIGS. 1-15, thus will not be repeated herein. FIGS. 18-19 do not illustrate the use of one or more O-rings; however, it will be appreciated that the torque retention arrangement illustrated in FIGS. 18-19 could optionally include one or more O-rings and a modified carrier having one or more O-ring slots (as illustrated in FIGS. 5-8) and/or a coating arrangement on one or more of the springs (as illustrated in FIGS. 5-9). As can also be appreciated, the flap plate and plate slot arrangements illustrated in FIG. 10 can optionally be used in the fingers of the carrier illustrated in FIGS. 18-19. As also can be appreciated, the seal illustrated in FIGS. 11-12 could optionally be used in the fingers of the carrier illustrated in FIGS. 18-19. As can also be appreciated, the seal liner illustrated in FIGS. 13-15 could optionally be used in the fingers of the carrier as illustrated in FIGS. 18-19.

It is to be appreciated that the open area (i.e., discontinuous circumferential shape) in the carrier 712, 812 shown in FIGS. 16 and 18, allows the carrier 712, 812 to fit about an existing system such as, but not limited to, an existing pipe system. The carrier can be designed to be positioned between the flanges of two pipe sections. Alternatively, the carrier can be positioned about a pipe section and adjacent to the pipe section flange such that the carrier is not positioned between the flanges of two pipe sections. In such an arrangement, the pipe section need not be separated to use the torque retention arrangement of the present invention. The carrier of the torque retention arrangement can simply be placed about one of the pipe section while the flanges of the two pipe sections remain positioned together. The connectors used to connect the two flanges together (e.g., bolt and nut, screw, etc.) are passed through the openings in the flanges and through the spring holes in the torque retention arrangement and then tightened. This configuration of the torque retention arrangement can be used to easily and conveniently use the torque retention arrangement on existing pipe systems without having to take apart the pipe sections and separating the flanges of the pipe sections.

The carriers described herein can be formed of metal or plastic materials. The spring arrangements are described as a plurality of springs. The spring arrangements as shown include three or four springs in each stack; however, other numbers of springs can be used. The spring stacks can be snapped into the carrier; however, other retention arrangements can be used (e.g., adhesive, melted bond, solder, weld bead, hook and loop fastener, fiction fit, etc.).

The carrier and spring stacks as shown in the figures comprise a monolithic body. It is to be appreciated that the spring action of the disc springs are concentrated under each bolt. The thickness of the carrier provides for a desired visual cue to achieve the recommended torque in ft.-lbs. The material of the carrier can be produced to meet the necessary chemical resistance and operating temperatures of the piping system and flange connectors.

As described above, the disc springs can be coated with an anti-gallant, lubricant, or anti-corrosion coating to further improve fastener torque accuracy. Additionally, the fastener stack can be protected from the pipe contents, namely, exposure of the pipe contents by the incorporation of O-rings, gaskets around each spring stack, individually protected springs, protection around the entire stack, the carrier partially encasing the disc spring outer diameters, and/or a bottom seal molded into the carrier surrounding each spring stack out of plane. All of the aforementioned protections of the fastener stack enables compression in order to seal when torqued.

It is to be appreciated that the torque flange connector is generally a monolithic body that is resistant to chemicals and temperatures.

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to referred and alternate embodiments. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall therebetween.

What is claimed:

1. A method for connecting pipes sections together comprising:
   a. providing a first pipe section having a first flange;
   b. providing a second pipe section with a second flange;
   c. providing a torque retention arrangement, said torque retention arrangement including:
      a carrier having a first side and a second side opposite from and spaced from said first side, said carrier includes a plurality of through spring holes spaced around a circumference of said carrier;
      a first set of springs stacked within a first spring hole of said carrier, said first set of springs including first and second springs, each of said springs in said first set of springs is aligned in a vertical arrangement so as to be able to receive a first bolt therethrough, said first spring in said first set of springs is configured to be non-coplanar with said carrier in a pre-torque orientation and all of said springs in said first set of springs are configured to be coplanar with said carrier in a loaded and torqued orientation, said first spring of said first set of springs stacked above said second spring of said first set of springs, a top surface of said first spring of said first set of springs positioned above said first side of said carrier in said pre-torque orientation, said first and second springs of said first set of springs configured to enable said top surface of said first spring of said first set of springs to move downwardly toward said first side of said carrier in said torque orientation; and,
      a second set of springs stacked within a second spring hole of said carrier, said first set of springs including a first and second springs, each of said springs in said second set of springs is aligned in a vertical arrangement so as to be able to receive a second bolt therethrough, said first spring in said second set of springs is configured to be non-coplanar with said carrier in a pre-torque orientation and all of said springs in said second set of springs are configured to be coplanar with said carrier in a loaded and torqued orientation, said first spring of said second set of springs stacked above said second spring of said second set of springs, a top surface of said first spring of said second set of springs positioned above said first side of said carrier in said pre-torque orientation, said first and second springs of said second set of springs configured to enable said top surface of said first spring of said second set of springs to move downwardly toward said first side of said carrier in said torque orientation;
   d. inserting said torque retention arrangement adjacent to said first flange;
   e. inserting a body of said first bolt through said first and second flanges such that said body of said first bolt passes through said first set of springs in the torque retention arrangement, a first bolt opening in said first flange, and a first bolt opening in said second flange;
   f. inserting a body of said second bolt through said first and second flanges such that said body of said second bolt passes through said second set of springs in the torque retention arrangement, a second bolt opening in said first flange, and a second bolt opening in said second flange; and,
   g. fastening and tightening a nut to an end of said first and second bolts to cause said first and second flanges to be drawn together and to cause said springs in said first and second spring sets to move to said loaded and torqued orientation and become coplanar with said carrier, and
   wherein aligning said springs coplanar with said carrier visually indicates a proper torque force, and wherein a top surface of said second spring of said first and second set of springs is positioned below said top surface of said carrier when said first and second set of springs are in said post-torque orientation.

2. The method as defined in claim 1, wherein said torque retention arrangement is configured to enable a user to visually see at least one of said springs in said first and second spring sets in said loaded and torqued orientation and coplanar with said carrier so as to be able to determine that a proper torque force has been applied to said nuts.

3. The method as defined in claim 2, wherein at least one of said springs in said first and second sets of springs is a disc spring.

4. The method as defined in claim 3, wherein all of said springs in said first and second set of springs are non-coplanar with said carrier in said pre-torque orientation.

5. The method as defined in claim 4, wherein at least one of said springs in said first and second set of springs includes a coating, said coating designed to perform one or more functions selected from the group consisting of inhibiting a) inhibiting corrosion of said spring, b) inhibiting sticking together of adjacently positioned springs, c) inhibiting impaired movement of adjacently positioned springs, d)

inhibiting excessive or undesired wear of said spring, and e) inhibiting damage to said spring.

6. The method as defined in claim 4, wherein said carrier includes an O-ring around a perimeter of at least one of said spring holes of said carrier, said O-ring configured to facilitate in forming a seal about said at least one spring hole when said during and after said step of fastening and tightening a nut to an end of said first and second bolts.

7. The method as defined in claim 4, wherein said carrier includes a flap plate at least partially inserted in said first spring hole of said carrier to limit downward movement of a peripheral edge of at least one of said springs in said first set of springs as said spring moves from said pre-torque orientation to said torqued orientation.

8. The method as defined in claim 4, including a flexible seal positioned in each of said first and second spring holes, said flexible seal in said first spring hole engaging a plurality of said springs in said first set of springs and positioned between an outer peripheral edge of said springs and a first inner wall surface of said first spring hole, said flexible seal in said second spring hole engaging a plurality of said springs in said second set of springs and positioned between an outer peripheral edge of said springs and a second inner wall surface of said second spring hole, said springs in said first set of springs causing said flexible seal to deform as said springs move from said pre-torque orientation to said torqued orientation, said springs in said second set of springs causing said flexible seal to deform as said springs move from said pre-torque orientation to said torqued orientation.

9. The method as defined in claim 4, wherein said carrier is flexible and includes a side slot to enable said carrier to be fitted about a pipe during said step of inserting said torque retention arrangement adjacent to said first flange.

10. The method as defined in claim 4, wherein said springs in said first set of springs has a total height in said loaded and torqued orientation that is equal to or less than a thickness of a portion of said carrier that includes said first set of springs, said springs in said second set of springs has a total height in said loaded and torqued orientation that is equal to or less than a thickness of a portion of said carrier that includes said second set of springs.

11. The method as defined in claim 4, wherein each of said first and second set of springs include a coating around an exterior perimeter of said first and second set of springs.

12. The method as defined in claim 4, wherein said carrier includes a plurality of fingers, a first finger includes one of said spring holes that includes said first set of springs, a second finger includes one of said spring holes that includes said second set of springs.

13. The method as defined in claim 4, including a first and second grommets, said first grommet positioned in and connected to said first spring hole, said first grommet including said first set of springs, said first set of springs positioned in an interior cavity of said first grommet, said second grommet positioned in and connected to said second spring hole, said second grommet including said second set of springs, said second set of springs positioned in an interior cavity of said second grommet.

14. The method as defined in claim 4, including wherein said step of inserting includes inserting said torque retention arrangement at least partially between said first flange of said first pipe section and said second flange of said second pipe section while said torque retention arrangement is in pre-torque orientation.

15. The method as defined in claim 4, wherein said carrier is a one-piece carrier.

16. The method as defined in claim 4, wherein said plurality of spring holes are equi-spaced around a circumference of said carrier.

17. The method as defined in claim 1, wherein at least one of said springs in said first and second sets of springs is a disc spring.

18. The method as defined in claim 1, wherein all of said springs in said first and second set of springs are non-coplanar with said carrier in said pre-torque orientation.

19. The method as defined in claim 1, wherein at least one of said springs in said first and second set of springs includes a coating, said coating designed to perform one or more functions selected from the group consisting of inhibiting a) inhibiting corrosion of said spring, b) inhibiting sticking together of adjacently positioned springs, c) inhibiting impaired movement of adjacently positioned springs, d) inhibiting excessive or undesired wear of said spring, and e) inhibiting damage to said spring.

20. The method as defined in claim 1, wherein said carrier includes an O-ring around a perimeter of at least one of said spring holes of said carrier, said O-ring configured to facilitate in forming a seal about said at least one spring hole when said during and after said step of fastening and tightening a nut to an end of said first and second bolts.

21. The method as defined in claim 1, wherein said carrier includes a flap plate at least partially inserted in said first spring hole of said carrier to limit downward movement of a peripheral edge of at least one of said springs in said first set of springs as said spring moves from said pre-torque orientation to said torqued orientation.

22. The method as defined in claim 1, including a flexible seal positioned in each of said first and second spring holes, said flexible seal in said first spring hole engaging a plurality of said springs in said first set of springs and positioned between an outer peripheral edge of said springs and a first inner wall surface of said first spring hole, said flexible seal in said second spring hole engaging a plurality of said springs in said second set of springs and positioned between an outer peripheral edge of said springs and a second inner wall surface of said second spring hole, said springs in said first set of springs causing said flexible seal to deform as said springs move from said pre-torque orientation to said torqued orientation, said springs in said second set of springs causing said flexible seal to deform as said springs move from said pre-torque orientation to said torqued orientation.

23. The method as defined in claim 1, wherein said carrier is flexible and includes a side slot to enable said carrier to be fitted about a pipe during said step of inserting said torque retention arrangement adjacent to said first flange.

24. The method as defined in claim 1, wherein said springs in said first set of springs has a total height in said loaded and torqued orientation that is equal to or less than a thickness of a portion of said carrier that includes said first set of springs, said springs in said second set of springs has a total height in said loaded and torqued orientation that is equal to or less than a thickness of a portion of said carrier that includes said second set of springs.

25. The method as defined in claim 1, wherein each of said first and second set of springs include a coating around an exterior perimeter of said first and second set of springs.

26. The method as claimed in claim 1, wherein said carrier includes a plurality of fingers, a first finger includes one of said spring holes that includes said first set of springs, a second finger includes one of said spring holes that includes said second set of springs.

27. The method as defined in claim 1, including a first and second grommets, said first grommet positioned in and connected to said first spring hole, said first grommet including said first set of springs, said first set of springs positioned in an interior cavity of said first grommet, said second grommet positioned in and connected to said second spring hole, said second grommet including said second set of springs, said second set of springs positioned in an interior cavity of said second grommet.

28. The method as defined in claim 1, including wherein said step of inserting includes inserting said torque retention arrangement at least partially between said first flange of said first pipe section and said second flange of said second pipe section while said torque retention arrangement is in a pre-torque orientation.

29. The method as defined in claim 1, wherein said carrier is a one-piece carrier.

30. The method as defined in claim 1, wherein said plurality of spring holes are equi-spaced around a circumference of said carrier.

* * * * *